Figure 9:
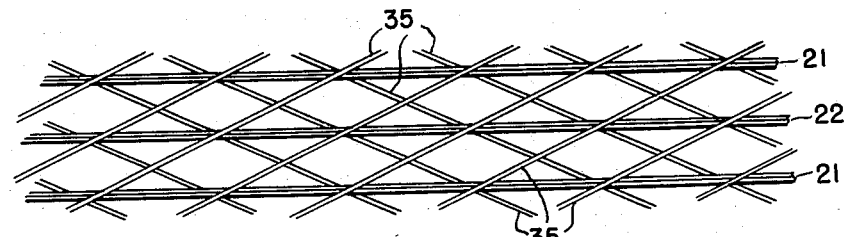

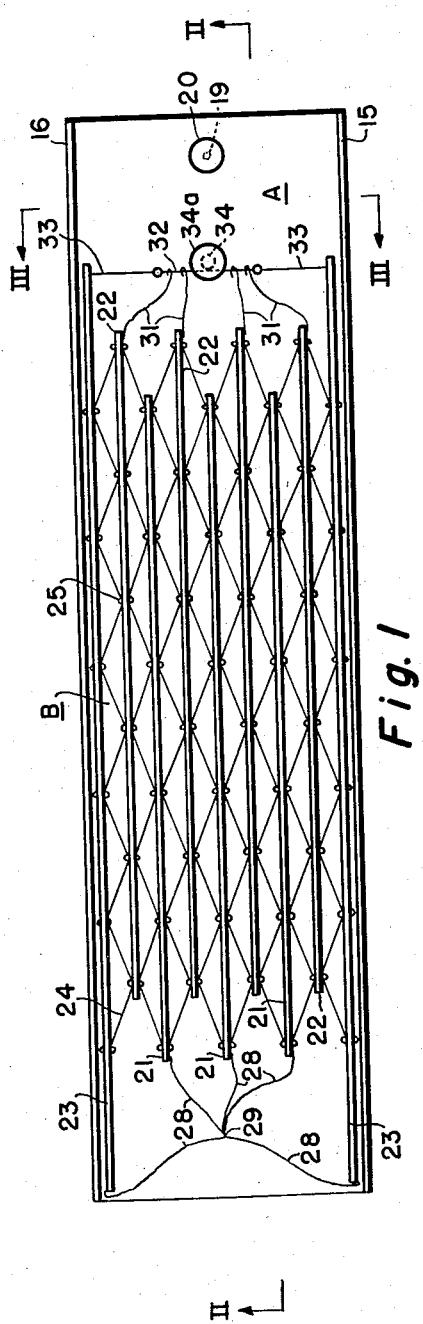
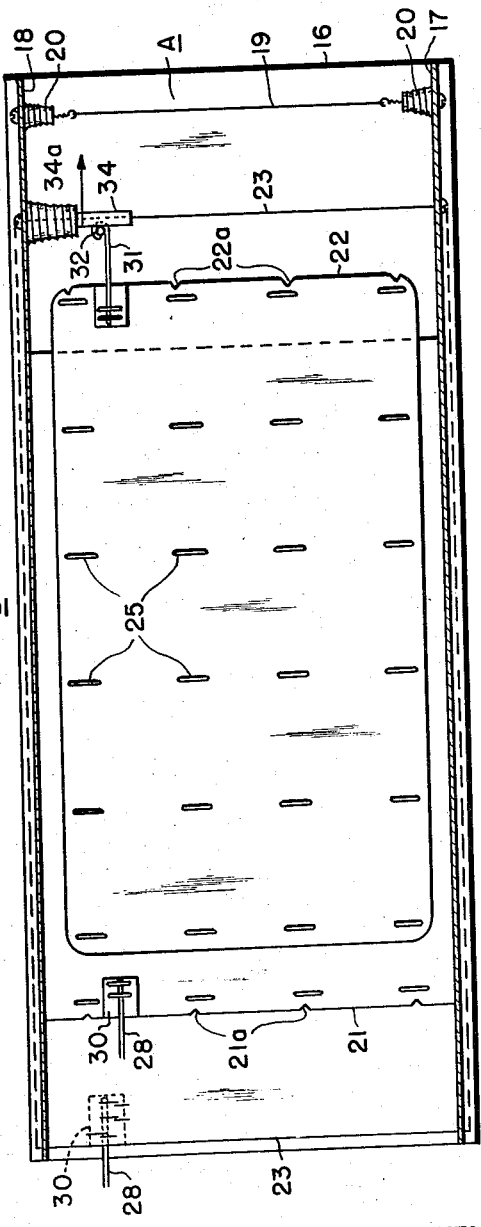

March 3, 1959 G. W. PENNEY 2,875,845
ELECTROSTATIC PRECIPITATOR
Filed March 18, 1955 5 Sheets-Sheet 2
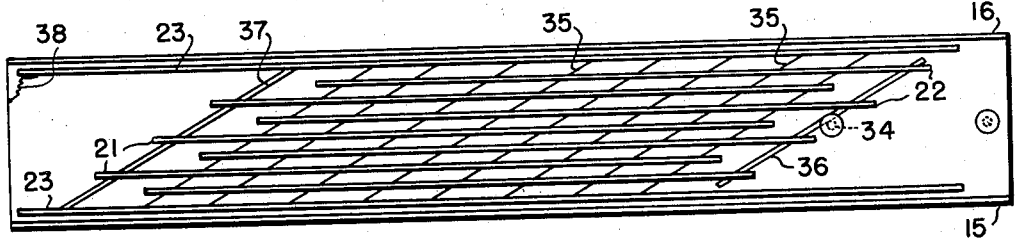
Fig. 10
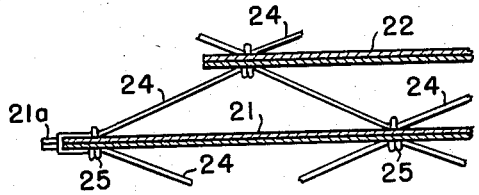
Fig. 4
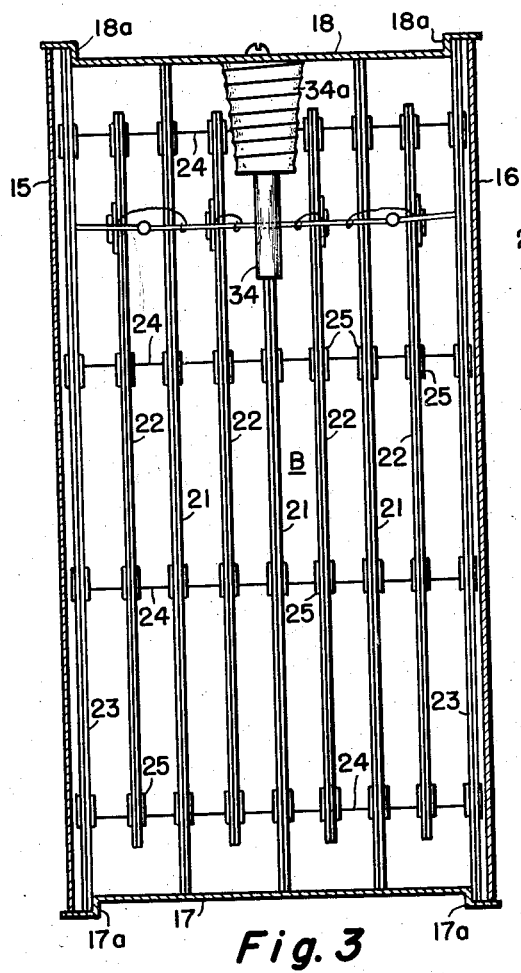
Fig. 3
Fig. 5
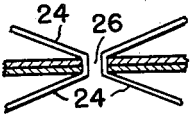
Fig. 6
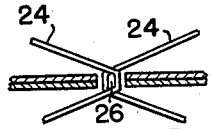
Fig. 7
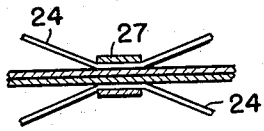
Fig. 8
INVENTOR.
Gaylord W. Penney
BY
HIS ATTORNEYS March 3, 1959     G. W. PENNEY     2,875,845
ELECTROSTATIC PRECIPITATOR Filed March 18, 1955     5 Sheets-Sheet 3

INVENTOR.
Gaylord W. Penney
BY
HIS ATTORNEYS

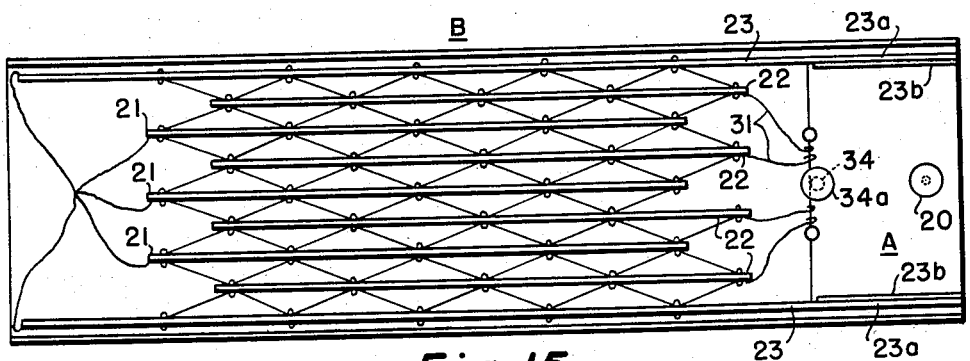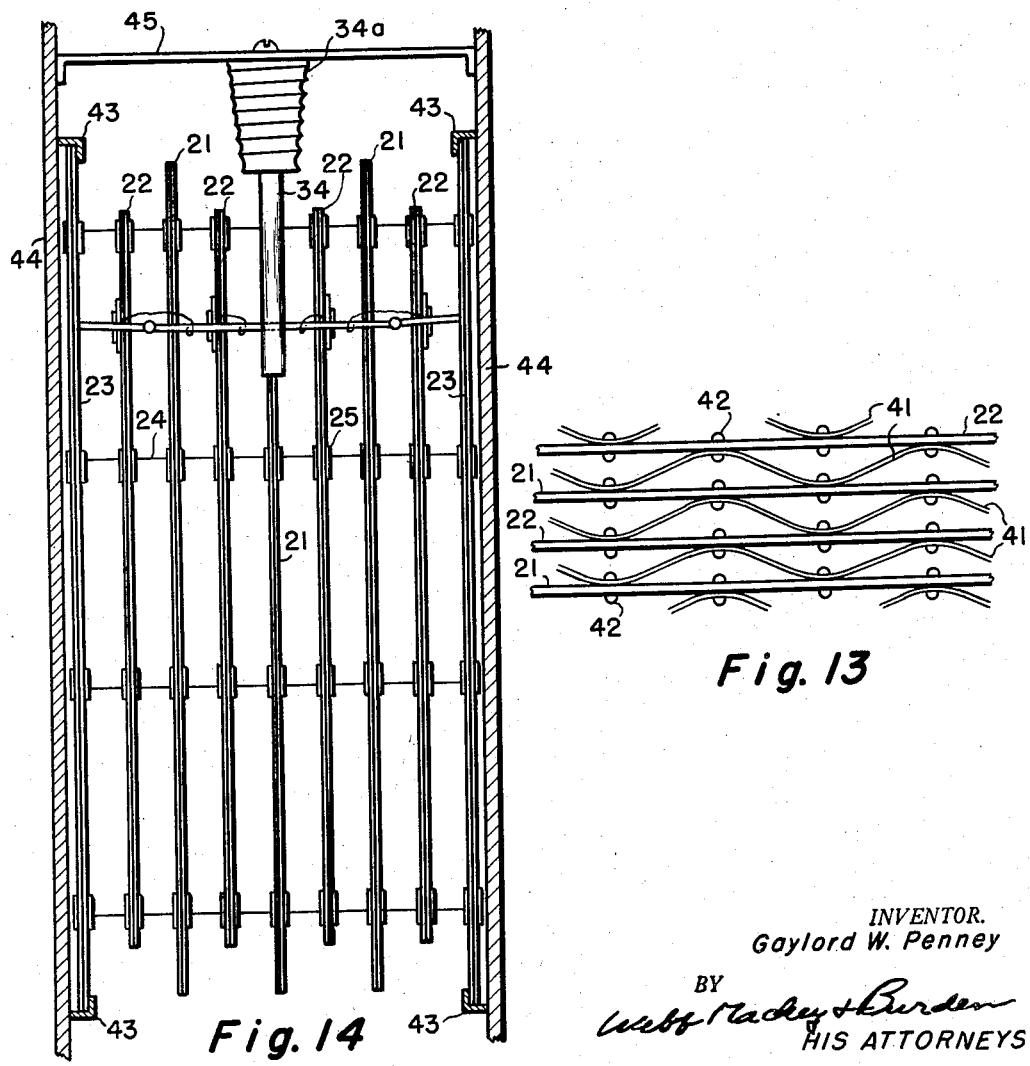

March 3, 1959

G. W. PENNEY 2,875,845

ELECTROSTATIC PRECIPITATOR

Filed March 18, 1955

5 Sheets-Sheet 5

INVENTOR.
Gaylord W. Penney

BY
Walt Mackey & Burden
HIS ATTORNEYS

United States Patent Office 2,875,845
Patented Mar. 3, 1959

2,875,845
ELECTROSTATIC PRECIPITATOR
Gaylord W. Penney, Pittsburgh, Pa.

Application March 18, 1955, Serial No. 495,265

14 Claims. (Cl. 183—7)

This application relates particularly to electrostatic precipitators of the so-called two-stage type, such as is disclosed in my prior Patents Nos. 2,129,783 and 2,181,717, in which there is an ionizing unit or section and a collecting unit or section. In such two-stage precipitators, air, other gases, or fluids to be cleaned are passed first through the ionizing unit, during which the particles to be removed from the air are given an electrical charge. The air then passes through the collecting section in which the charged particles are attracted to and adhere to electrically charged plates. Periodically, the charged plates are cleaned of the collected particles. Such two-stage precipitators are generally used whenever the air to be cleaned is subsequently breathed by human beings, because such precipitators do not generate large quantities of ozone and nitrous oxides, as is the case with the ordinary Cottrell precipiattor in which both the ionizing and the collecting occurs in a single chamber.

These two-stage precipitators, while extremely effective in cleaning air for human consumption without generating excessive ozone, nevertheless have presented a serious problem so far as disposing of the foreign particles removed from the air is concerned. Generally, the collecting plates are periodically washed and the water, with the dirt particles, passed into a drain to a sewer. This has required water connections for the washing water and also drain connections to a sewer. Obviously, such an installation is suitable only for houses having central circulating hot air systems because it would not be feasible to make such water and drain connections for precipitators in each room of a house. Although there have been many attempts to solve this dirt disposal problem prior to my invention there has been no satisfactory electrostatic precipitator for homes heated by means other than hot air, such as steam or hot water. Likewise, there has been no satisfactory precipitator for individual rooms, such as hospital rooms, sick rooms, offices, etc.

I have invented a two-stage electrostatic precipitator in which the collecting section and preferably also the ionizing section are made of materials so inexpensive that, after dirt has been collected on the sections to such an extent that cleaning is required, the two sections can be thrown away and replaced by new sections. My precipitator, therefore, does not require expensive installation to water and drain pipes. It can be made in a large range of sizes, so that it can be used to clean a substantial volume of air in a house heated by hot water or steam, and in small sizes to clean the air in individual rooms.

Figure 11:
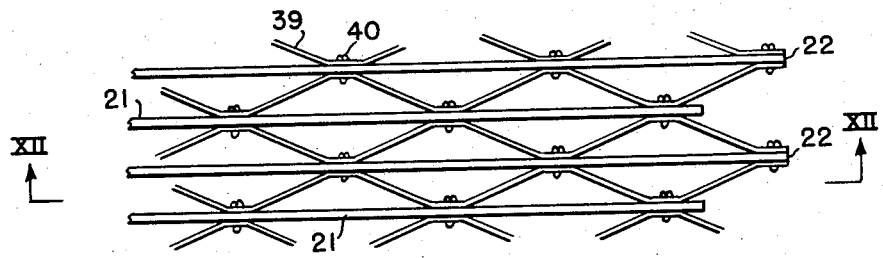
Figure 12:
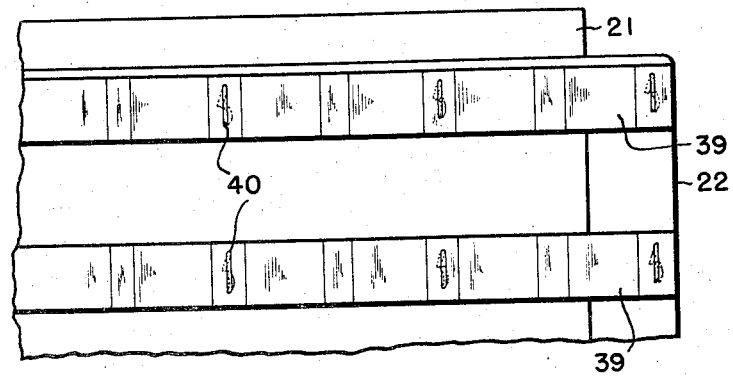
Figure 16:
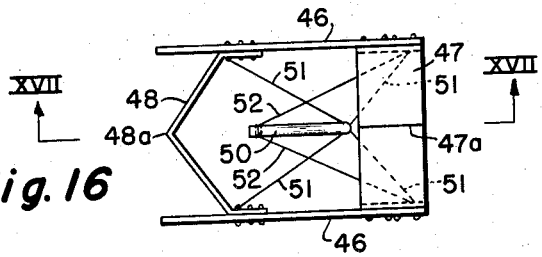
Figures 17, 18:
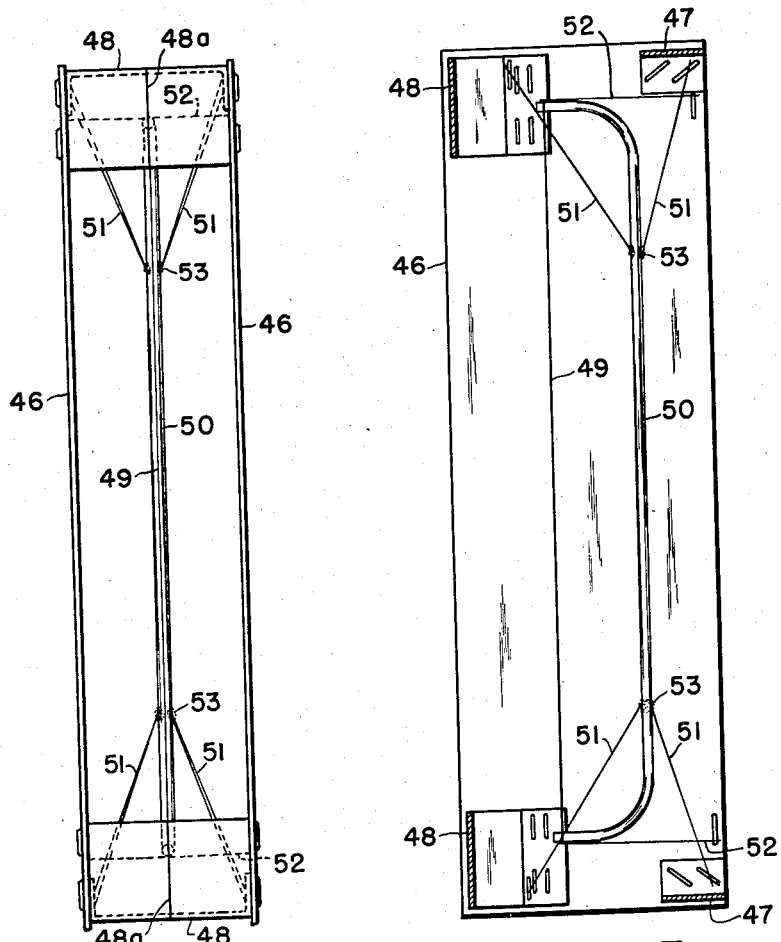

In the accompanying drawings, I have illustrated certain present preferred embodiments of my invention, in which:

Figure 1 is a plan view of one form of my precipitator with the top of the casing of the precipitator removed;

Figure 2 is a section along the lines II—II of Figure 1;
Figure 3 is a section along the lines III—III of Figure 1;
Figure 4 is a fragmentary horizontal section through two adjacent plates of the collecting cell in the precipitator shown in Figure 1;
Figure 5 is a partial elevation view of one of the plates shown of the collecting cell in the precipitator shown in Figure 1;
Figures 6, 7, and 8 are views, similar to Figure 4, showing modifications of the collecting cell in the precipitator shown in Figure 1;
Figure 9 is a partial plan view of a modified form of collecting cell;
Figure 10 is a view, similar to Figure 1, showing another form of a precipitator embodying my invention;
Figure 11 is a fragmentary plan view of another modified form of collecting cell;
Figure 12 is a section along the lines XII—XII of Figure 11;
Figure 13 is a fragmentary plan view of still a further modified form of collecting cell;
Figure 14 is a section, similar to Figure 3, showing a modified form of a precipitator embodying my invention;
Figure 15 is a plan view, similar to Figure 1, showing a precipitator involving a modified form of ionizing unit;
Figure 16 is a plan view of an ionizing unit which may be used in my precipitator;
Figure 17 is a section along the lines XVII—XVII of Figure 16; and
Figure 18 is a front elevation view of the ionizing unit.

Referring to Figures 1 to 3, a precipitator embodying my invention comprises a casing having sides 15 and 16, a bottom 17, and a top 18. In Figure 1, the top 18 is removed for purposes of illustration. Within the casing, there is an ionizing section A and a collecting section B.

The ionizing section comprises an ionizing wire 19 supported on insulators 20 secured to the bottom 17 and top 18 of the casing and electrodes on each side of the ionizing wire which, in this case, are formed by the portions of the sides 15 and 16 of the casing which are opposite to the ionizing wire. The casing is at ground potential and the ionizing wire is connected to a source of high potential relative to the casing, in accordance with conventional means not shown in the drawings.

The collecting section comprises two series of plates 21 and 22. As shown in Figures 1 and 3, the two series of plates extend parallel to but spaced from each other across the width of the casing of the precipitator. The plates 21 are connected to ground through the casing and the plates 22 are charged to a high potentail relative to the plates 21 and the casing. The two series of plates 21 and 22 must, therefore, be insulated from each other. The two outside plates 23 of the collecting cell B are also grounded and, as shown in Figure 1, they are longer than the plates 21 or 22.

The plates 21 and 23 collect the dirt and other particles from the air being cleaned, most of the dirt adhering to the ground plates 21. Since I intend that after the plates have become dirty they are thrown away, these plates must be made of a cheap, readily available material. I propose to make the plates of a variety of several cheap materials, such as electric insulating material to which a conductive coating has been applied, for example, stiff paper or cardboard which has been coated with metal foil or an electrically conductive varnish or paint. Each plate may be formed of such electric insulating material with a conductive coating on both sides, or two sheets of the electric insulating material, with a conductive coating on only one side, can be placed together with the two sides having the conductive coating placed between them. Alternatively, one sheet can be coated with conductive material which is covered with a plain sheet. This construction is shown in Figures 3 to 9, inclusive. Likewise, the plates can be made of electrically conductive paper or cardboard or of thin metal sheets. If the plates are made of paper or cardboard, they should be treated with a fire-retarding preparation, such as tricresyl phosphate.

The construction and material of the collecting plates are determined by the fact that these plates must have an electrical resistance sufficiently low that charges on the collected dust can be conducted without producing an excessive voltage drop relative to the voltage which is maintained between adjacent collecting plates. The particular choice of material for the plates and the construction can be determined readily by calculation. For example, assume a collecting plate which is 12" square and .03" thick is to be used and that a typical voltage is to be applied to the plates, i. e., 6,000 volts, and that smoky air is being cleaned. In this case, the charge collected by the plates is in the order of $10^{-7}$ amperes per plate. This is a higher charge than is normally collected in average atmospheres, but $10^{-7}$ is a reasonable example.

Ordinary paper such as is intended to be used in my collecting cell has a resistivity of $10^{12}$. If such paper were used without a conductive coating, the plate current must flow lengthwise of the paper. By conventional calculations, it can be determined that the potential drop along the paper would be in the order of 660,000 volts, which obviously would prevent the collecting cell from operating. If a conductive varnish is placed between two pieces of paper, then the length of the current flow is only the thickness of the cardboard, and only one-half of the current must flow through this cardboard. Using the same value of resistivity for the two pieces of paper making up the plate, conventional calculations will show that the voltage drop is only approximately 4 volts. Such a voltage drop is negligible with reference to a typical plate voltage of 6,000 volts. If a plate is made of conducting paper, a resistivity of $10^7$ produces a voltage drop along the plate of 6.6 volts. This likewise is negligible. A resistivity of $10^8$ is acceptable, and higher resistivities, such as $10^9$ or $10^{12}$, can be used without appreciable loss in efficiency, except when large quantities of smoke are being removed from the air being filtered.

Since a high potential difference is maintained between the plates 21 and 22, it is necessary that the plates be insulated from each other and that they be spaced a uniform distance from each other throughout their lengths. Also, since I propose to make the plates of paper or relatively thin cardboard, the plates must be supported at spaced intervals across their surfaces. Accordingly, I support the plates and space them from each other by slender insulators, i. e., insulators which are long relative to their cross-sectional area. The insulators are arranged so that their central axes form an acute angle with the surfaces of the plates, with the result that the length of the portions of the insulators between the plates is sufficiently long relative to the direct distance between adjacent plates that the insulators provide sufficient creep (i. e., distance along the surface of an insulator in the direction of current flow) to prevent sparkover.

The length of the portions of the insulators between the plates, relative to the direct distance between adjacent plates, depends upon a number of factors, particularly the potential difference between the charged and ground plates. In general, I have found that the distance along the insulators between the plates should be at least twice the distance directly between the plates. Preferably, the distance along the insulators should be three or four times the distance directly across the plates.

As shown in Figures 1, 3, 4 and 5, I may use for the insulators relatively fine threads 24 made of nonhydroscopic, non-conducting material, such as nylon, waxed or shellacked cotton, silk, polyethylene, polystyrene, etc. As shown in Figure 1, these threads are secured at intervals along the lengths of the plates and extend alternately back and forth between adjoining plates. The threads are so secured to the plates that they form an acute angle with the surfaces of the two plates between which they extend, so that the creep distance is three or four times the sparkover distance. Inasmuch as the plates are made of rather flexible material, several rows of threads are provided between the plates. In Figures 2 and 3, four rows of threads between each pair of adjoining plates are shown.

The threads themselves, of course, will not hold the plates in proper position. It is necessary that the outer plates 23 be held apart by some means so that the resulting tension on the threads automatically spaces the balance of the plates, as shown in Figure 1.

Referring to Figure 3, it will be seen that I provide offset portions 17a in the bottom 17 of the casing and offset portions 18a in the top of the casing. The side plates 23 which, as shown in Figure 3, are taller than the balance of the plates, fit behind the offset portions 17a and 18a. When a collecting cell is installed in the casing, the side plates 23 are pulled apart as far as the threads 24 will permit and are slipped behind the offset portions 17a and 18a, whereupon the entire casing is slid into the casing from the open end of the casing. Since the sides 23 are held apart by the offset portions 17a and 18a, pull on the threads connected to the side plates 23 and the other plates, automatically spaces the plates 21 and 22, as shown in Figures 1 and 3.

Inasmuch as the plates 23 are not supported except along their top and bottom edges, I have found it advisable to make these plates thicker than the balance of the plates in the cell.

The threads may be secured to the plates in a variety of ways. As shown in Figures 1 to 5, inclusive, the threads may be secured to the plates by staples 25. Referring to Figure 1, it will be seen that the threads 24 between adjacent plates remain on the same side of the two plates. For example, the thread at the top of Figure 1 between the side plate 23 and the first charged plate 22 extends from the inside surface of the plate 23 over to the surface of the charged plate which faces the plate 23, then back to the inside surface of the plate 23, back again to the surface of the charged plate facing the plate 23, and so on for the length of the plate 22. The thread then passes around the edge of the plate 22 in one of the notches 22a and over to a ground plate 21. It proceeds back and forth between the two opposed surfaces of the plates 22 and 21 until it reaches the end of the plates 21, where it is passed around the edge of the plate in one of the notches 21a, and so on. (For purposes of clarity, the threads are not shown in the notches 21a or 22a in Figure 2.)

As shown in Figure 4, each staple 25 holds a thread on each side of a plate 21 or 22. Therefore, as shown in Figure 5, the legs of the staple, which are folded over, overlap each other to hold the threads on their side of the plates, instead of extending only part way towards each other, as in conventional stapling operations.

Figures 6 to 8, inclusive, show other ways in which the threads can be secured to the plates. Figure 6 shows the threads passed through holes 26 in the plates, the threads being bent around the edges of the holes so as to follow a zigzag path from plate to plate across the cell. Figure 7 shows a method similar to that shown in Figure 6, except that the threads are looped with each other within the hole 26 so as to avoid direct pull by the threads on the edges of the plates. In Figure 8, the threads are passed from one plate to the other in the same manner as shown in Figure 4, but are held to the plates by strips 27 glued to the surfaces of the plates. These strips extend from top to bottom of each plate and hold each of the several horizontal rows of threads which are used to support the plates.

The electrical connections for the plates will now be described with particular reference of Figures 1, 2, and 3. Referring first to the connections for the ground plates 21, the side plates 23, as has been explained, are in direct contact with the casing of the precipitator, which, in turn, is grounded. Conductive threads or small wires 28, leading one from each of the ground plates and one from each of the plates 23, are joined together at 29. I secure the conductors 28 to the plates 21 and 23 by staples (see Figure 2). In order to obtain a good electrical connection between the conductors and the plates, I also staple a small patch of metal foil 30 between the conductors 28 and the plates.

The high potential plates 22 each have a conductor 31 leading from the plates to a short length of wire 32 (see Figures 1 and 2). Nonconducting threads 33, of the type used for spacing the plates, are secured to the side plates 23 adjacent their forward upper corners and to the ends of the wire 32. The length of the nonconducting threads 33 is so determined that, when the collecting cell is placed inside the casing and the side plates 23 spread apart, the threads 33 and the wire 32 extend substantially in a straight line between the side plates 23. This brings the wire 32 into contact with a conductive post 34 supported from the top 18 of the casing by an insulator 34a. The post 34 is connected to a source of high potential in a conventional manner, not shown.

The conductive threads or wires 28 and 31 should have a high resistivity so that only a very small current will flow in the event of sparkover between the plates. This minimizes the danger of fire when paper or cardboard collecting plates are used. It should be noted that the use of a high resistance in series with each plate to limit fire is feasible only in a collecting cell embodying my invention, in which each high potential or "hot" plate of the cell is insulated from every other plate. The use of such a high resistance is not feasible in conventional collecting cells where all the "hot" plates are electrically connected to each other.

A suitable resistance value for the threads or wires can readily be determined by calculation. Thus, it is known that, if the energy in any sparkover or leakage path is limited to a small value in the order of 1 watt, a fire will not result in dusts usually collected. Tests also show that, if the current is limited to $5 \times 10^{-4}$ amperes, a fire will not be produced in usual materials, such, for example, as I propose for the collecting plates. Again, assuming a typical voltage across the plates of 6,000 volts, a resistance of 12 megohms will limit the current to this value. A current of $5 \times 10^{-4}$ amperes at 6,000 volts produces 3 watts of energy, but it must be kept in mind that, in case of a short circuit, all of the power is consumed in the resistance lead. There is no problem so far as igniting dust between the plates is concerned. As the electrical resistance of the dust increases, the voltage drop across the dust will increase and the current will decrease, but at a considerably lower rate than the voltage increases. Conventional calculations show that maximum heating of the dust will occur when the resistance of the dust is equal to the resistance of the conductive threads or wires. Assuming that the conducting threads or wires have a resistance of 12 megohms, then the total resistance to which the 6,000 volts is applied is $24 \times 10^6$ ohms, giving a short circuit current for this maximum heating in the dust of $.25 \times 10^{-3}$ amperes, so that the total heating is 1.5 watts, of which .75 watts are dissipated in the dust. As stated, this is not enough to cause a fire in dust usually collected.

Again, assuming a collection current of $10^{-7}$ amperes, the voltage drop across the conductive threads or wires is 12 volts, which is negligible relative to the 6,000 volts which is to be applied to the plates. Thus, a resistance of 10 to 100 megohms is series with each plate can limit the current to a value too small to set ordinary material on fire and yet not appreciably lower the efficiency of the collecting cell in normal operations. Substantially the same result can be obtained by connecting a single resistance in series with several (i. e., two or three) of the plates.

Figures 9 and 10 illustrate a second means which I have invented for mounting the plates in the collecting cell. This second means comprises rigid plastic rods 35 which are passed through the plates 21 and 22 so as to form acute angles with the surfaces of the plates, in the same manner as the threads described above. The structure shown in Figure 9 is not collapsible. However, in the collecting cell shown in Figure 10, the plastic rods are parallel to each other and, by hinging the rods 35 to the side plates 23 by short flexible tapes, the cell can be made to collapse.

As shown in Figure 10, the hot plates 22 carry, at their front end, a conductor 36 which, when the cell is open and placed within the casing, engages the high potential conductive post 34. The ground plates 21 and the side plates 23 carry a conductor 37, and the side plates are grounded, as at 38.

Figures 11 and 12 illustrate another arrangement which I have invented for supporting and spacing the plates. In this arrangement, the threads described with reference to Figures 1 to 3, inclusive, are replaced by flat nonconductive tapes 39, which may be made, for example, of plastic, such as polystyrene, polyethylene, or nylon, which are passed back and forth between the plates in the same manner as the threads described above, and are held in place on the plates by staples 40.

Another way in which the plates may be held in position is shown in Figure 13, in which rigid, corrugated, nonconductive strips 41 are placed between the plates and secured thereto by staples 42. It will be noted from Figure 13 that the frequency of the corrugations in the strips 41 is such that the distance between the plates along the strips is substantially greater than the distance directly across the strips, so as to provide sufficient creep to prevent sparkover.

In Figures 1 to 3, I have shown a precipitator in which the collecting cell fills substantially the entire cross-sectional area of the portion of the casing in which it is placed. In this construction, it should be noted that the top and bottom edges of the high potential plates 22 are spaced from the bottom and top 17 and 18 of the casing a distance substantially equal to the distance between the high potential plates 22 and the ground plates 21, and that the ground plates extend the full distance between the top and bottom of the casing. The result of this construction is that a uniform potential gradient is maintained, not only between the surfaces of the high potential and ground plates, but also around the top and bottom edges of the high potential plates and between the top and bottom of the casing. All air passing through the collecting cell, therefore, passes through a high potential field of uniform intensity.

In many instances, however, the circulation of air through the filter by a conventional blowing system (not shown) may be relied on to confine the air being cleaned within the collecting cell. In such case, the casing may not have a top or bottom touching the ground plates and spaced from the high potential plates in the manner just described. Such a construction is shown in Figure 14, which is a view similar to Figure 3. In this construction, the side plates 23 of the collecting cell are supported in angles 43 on members 44 which may be the sides of the casing of the precipitator or partitions within the casing. A strap 45 extending between the members 43 supports the insulator 35, which, in turn, supports the conductive post 34 in the same relative position as these were supported in the precipitator shown in Figures 1 to 3, inclusive.

In describing the precipitator shown in Figures 1 to 3, inclusive, I pointed out that, in that structure, the sides 15 and 16 form the electrodes for the ionizing section A of the precipitator. In the operation of a precipitator, dirt tends to collect on the ground electrodes of the ionizing section and, therefore, it may be desirable to provide for the removal of this dirt in the same way that the dirt collected by the collecting cell is removed, i. e., by removal and disposal of a readily replaceable component. Figure 15 shows a structure by which this is accomplished. In the precipitator shown in Figure 15, the side plates 23 of the collecting cell are extended to the front of the casing, as at 23a, and utilized as the ground electrodes of the ionizing unit. It is desirable that a larger current pass between the ionizing wire and its cooperating electrodes than passes between the collecting plates, and, therefore, the conductivity of the portions 23a of the side plates 23 is increased by covering these portions with a layer of metal foil 23b. From Figure 15, it is apparent that, when the collecting cell is removed, the ground electrodes for the ionizing section will be removed at the same time and replaced with a new collecting cell.

I have also invented a disposable ionizing section which can be slipped into the casing of the precipitator from an open end, in the same way that a collecting cell can be slipped into the opposite open end of a casing. When the disposable collecting cell is discarded after an accumulation of dirt, my disposable ionizing section can likewise be replaced.

Figures 16 to 18, inclusive, show a disposable ionizing section which I have invented. The unit comprises electrodes 46, which may be made of the same materials as the collecting plates in the disposable collecting cell. However, the conductivity of the electrodes should be greater than the conductivity of the collecting plates. For an ionizing wire one foot long, the ionizing current will be in the order of 60 to 100 microamperes, which current must also, of course, be carried by the plate electrodes 46. This current is 1,000 times the current carried by the collecting plates and, therefore, the maximum permissible resistivity of the ionizing electrodes 46 must be about 1/1000th of the maximum resistivity permissible for the collecting plates. The conductivity can be increased by covering the electrodes with metal foil, spraying the opposing surface with metallic particles, or, in the case of conductive paper, by selecting paper having increased conductivity.

The two electrodes are held to each other by straps 47 and 48, which may be made of the same material as the electrodes 46. The straps 47 and 48 have fold lines 47a and 48a so that the unit can be collapsed by bringing the electrodes together for shipment or for disposal. From Figures 16 to 18, inclusive, it will be noted that the straps 47 lie in a horizontal plane and that the straps 48 lie in a vertical plane, and that the straps 48 are wider than the straps 47. The straps 48 have this increased width and are placed in a vertical position so as to act as baffles to the passage of air adjacent to the ends of an ionizing wire 49 which is supported between the electrodes 46. As is known, there are nonionizing zones adjacent each end of an ionizing wire and, therefore, the baffles prevent air from passing through these zones where the particles in the air would not be ionized.

I provide a rigid yoke 50 which may be made of heavy wire to support the ionizing wire, as shown particularly in Figure 17. Nonconductive threads 51 and 52 secured to the electrodes 46 and to the yoke 50 hold the ionizing wire in proper position relative to the electrodes 46 when the unit is opened up and placed within a precipitator. Threads 51, extending from the inside surfaces of the electrodes adjacent the upper and lower edges thereof to points 53 spaced on the yoke 50 part way in from the ends of the yoke, actually carry the yoke and, therefore, the ionizing wire 49. The threads 52, extending in from the ends of the yoke adjacent the point where the ionizing wires are secured to the yoke, serve to keep the yoke in alignment relative to the electrodes. These threads prevent the yoke from turning about its main longitudinal axis, and thereby keep the ionizing wire 49 properly spaced between the ground electrodes.

From the foregoing, it is apparent that I have solved a problem which has long faced manufacturers of electrostatic precipitators. In my precipitator, the ionizing unit and the collecting unit are made of low cost materials, so that these units may be disposed of when they have accumulated dirt. Elaborate washing equipment involving high installation costs is thereby avoided. My precipitator may be made in any desired size, and has a large number of important uses. It is particularly useful for cleaning the air in individual rooms, such as sick rooms in homes, bedrooms of persons suffering from pollen or dust allergies, hospital rooms, etc. It may be used in passenger airplanes where weight is an important consideration and where there is no possibility of installing washing facilities.

A very important result is that, for the first time, air may be cleaned in houses not heated by a central circulating hot air system.

While I have described certain present preferred embodiments of my inventions, it is to be understood that they may be otherwise embodied within the scope of the appended claims.

I claim:

1. A collecting cell for an electrostatic precipitator comprising two series of electrically conducting plates, the plates of one series being electrically insulated from the plates of the other series, the plates of both series being spaced equidistantly from each other along their lengths and alternating with each other across the width of the cell and insulators extending between and secured to the plates, said insulators being spaced at intervals across the width and length of the plates for holding the plates in position, said insulators being long relative to their cross-sectional area and having their longitudinal axes extending at an angle to the plates whereby the length of the portions of the insulators between plates extends substantially in a straight line between adjacent plates and provides sufficient creep to prevent sparkover between the plates.

2. A collecting cell for an electrostatic precipitator as described in claim 1, in which the insulators comprise threads of nonconducting and nonhydroscopic material.

3. A collecting cell for an electrostatic precipitator as described in claim 1, in which the insulators are in the form of rigid corrugated strips of nonconducting and nonhydroscopic material.

4. A collecting cell for an electrostatic precipitator as described in claim 1, in which the insulators are in the form of rigid rods of nonconducting and nonhydroscopic material.

5. A collecting cell for an electrostatic precipitator as described in claim 1, in which the insulators comprise flat strips of nonconducting and nonhydroscopic material.

6. A collecting cell for an electrostatic precipitator as described in claim 1, in which the plates are formed of electric insulating material covered with a conductive coating.

7. A collecting cell for an electrostatic precipitator as described in claim 1, in which the plates comprise sheets of electrically conductive cardboard.

8. A collecting cell for an electrostatic precipitator as described in claim 1, in which the plates each comprise two sheets of electric insulating material, at least one of which has a conductive coating placed between the two sheets.

9. A collecting cell for an electrostatic precipitator as described in claim 1, in which the plates comprise metal sheets.

10. A collecting cell for an electrostatic precipitator comprising two series of electrically conducting plates, the plates of one series being charged to a high voltage relative to the plates of the other series, means for mounting each high potential plate electrically insulated from all the other plates of both series, and a high resistance adapted to be connected in series between each high potential plate and a source of high electrical potential.

11. A collecting cell for an electrostatic precipitator comprising two series of electrically conducting plates, the plates of one series being charged to a high voltage relative to the plates of the other series, means for mounting each high potential plate electrically insulated from all the other plates of both series, and a high resistance conductor connecting each high potential plate to a source of high electrical potential.

12. A collecting cell for an electrostatic precipitator as described in claim 10, in which the resistance has a value to limit current to the plates to currents in the order of $5 \times 10^{-4}$ amperes.

13. A collecting cell for an electrostatic precipitator as described in claim 10, in which the resistance comprises a conductor having a resistance of a value to limit the current to the plates to currents in the order of $5 \times 10^{-4}$ amperes.

14. A collecting cell for an electrostatic precipitator as described in claim 1, in which the plates are made of electrically conductive cardboard and in which the insulators comprise threads of nonconducting and nonhydroscopic material, the threads being looped with each other within holes in the plates.

References Cited in the file of this patent
UNITED STATES PATENTS

| | | |
|---|---|---|
| 1,343,285 | Schmidt | June 15, 1920 |
| 2,275,001 | Anderson | Mar. 3, 1942 |
| 2,380,993 | Youngman | Aug. 7, 1945 |
| 2,447,933 | Cummings | Aug. 24, 1948 |
| 2,470,356 | Mackenzie | May 17, 1949 |
| 2,521,605 | Richardson | Sept. 5, 1950 |
| 2,565,458 | Weisz | Aug. 21, 1951 |
| 2,585,138 | Landgrof | Feb. 12, 1952 |
| 2,604,183 | Richardson | July 22, 1952 |
| 2,650,672 | Barr et al. | Sept. 1, 1953 |
| 2,789,657 | Fields | Apr. 23, 1957 |